US007240806B2

(12) United States Patent
Choi

(10) Patent No.: US 7,240,806 B2
(45) Date of Patent: Jul. 10, 2007

(54) ACUPUNCTURE NEEDLE CONTAINER AND DISPENSER

(76) Inventor: Jeung H. Choi, 2701 W. Alameda Ave., Suite #301, Burbank, CA (US) 91505

( * ) Notice: Subject to any disclaimer, the term of this patent is extended or adjusted under 35 U.S.C. 154(b) by 417 days.

(21) Appl. No.: 10/944,775

(22) Filed: Sep. 21, 2004

(65) Prior Publication Data

US 2005/0067310 A1 Mar. 31, 2005

Related U.S. Application Data

(63) Continuation-in-part of application No. 10/669,380, filed on Sep. 25, 2003, now Pat. No. 7,004,352.

(51) Int. Cl.
*B65G 59/00* (2006.01)
*B23Q 7/04* (2006.01)

(52) U.S. Cl. ...................................... 221/212; 221/263

(58) Field of Classification Search ................ 221/263, 221/270, 281, 155, 185, 233, 234, 236, 212; 206/380, 382, 383; 606/189; 604/61, 62
See application file for complete search history.

(56) References Cited

U.S. PATENT DOCUMENTS

| | | | | | |
|---|---|---|---|---|---|
| 3,305,084 | A | * | 2/1967 | Higgins et al. | 206/366 |
| 3,494,458 | A | * | 2/1970 | Meierhoefer | 206/366 |
| 3,905,375 | A | * | 9/1975 | Toyama | 606/189 |
| 4,116,333 | A | * | 9/1978 | Pavel | 206/380 |
| 4,139,011 | A | * | 2/1979 | Benoit et al. | 606/182 |
| 4,269,313 | A | * | 5/1981 | Smith | 206/380 |
| 4,518,384 | A | | 5/1985 | Tarello et al. | |
| 4,531,938 | A | | 7/1985 | Kay et al. | |
| 4,580,566 | A | * | 4/1986 | Hsu | 606/189 |
| 4,946,035 | A | | 8/1990 | Grimm et al. | |
| 5,100,021 | A | * | 3/1992 | Mussi et al. | 221/155 |
| 5,129,914 | A | | 7/1992 | Choi | |
| 7,004,352 | B2 | * | 2/2006 | Choi | 221/263 |
| 2003/0040767 | A1 | | 2/2003 | Gavronsky | |

* cited by examiner

*Primary Examiner*—David H. Bollinger
(74) *Attorney, Agent, or Firm*—Richard C. Litman

(57) ABSTRACT

An acupuncture needle container and dispenser to store and dispense a plurality of sterile acupuncture needles having a transparent top cover piece and an opaque colored bottom piece with a distal end, a proximal end and a middle portion. The transparent top cover piece fits over the opaque colored bottom piece and forms a semi-oval needle reservoir at the distal end, a cylindrical inserter at the proximal end and a channel formed between the semi-oval needle reservoir and the cylindrical inserter to allow for individual channeled movement of the plurality of acupuncture needles from the semi-oval needle reservoir through the formed channel and into the cylindrical inserter. The cylindrical inserter includes an insertion tube that may be magnetized to facilitate receiving and holding a single acupuncture needle in place until removed by a plunger from the dispenser.

9 Claims, 4 Drawing Sheets

ACUPUNCTURE NEEDLE CONTAINER AND DISPENSER

CROSS REFERENCE TO RELATED APPLICATION

This application is a continuation-in-part of U.S. application Ser. No. 10/669,380 filed Sep. 25, 2003, now U.S. Pat. No. 7,004,352.

BACKGROUND OF THE INVENTION

1. Field of the Invention

The present invention relates generally to a container and dispenser for holding and dispensing needles. More particularly, the invention is a container and dispenser for the holding and the sterile dispensing of acupuncture needles.

2. Description of the Related Art

The use of needles in the medical field is very common. Traditionally, acupuncture needles are provided with guide tubes, with the needles being threaded through the guide tubes before being used. The repeated use of guide tubes for threading needles fails to maintain sterility to the needles. Currently, acupuncture needles are available in blister packages, which provide sterility to the needles but are inconvienent and time consuming to use. The related art outlines the storage and dispensing of acupuncture needles and other types of needles.

United States Patent Application Publication No. 2003/0040767 published on Feb. 27, 2003, outlines the use of an acupuncture device with an acupuncture needle and guide tube having a transverse, preferably V-shaped slot through a tube wall. The slot is formed in the upper part of the guide tube and is substantially perpendicular to the axis of the tube. The handle of the needle is firmly secured inside the guide tube by a small elongated stopper made of an elastic material such as plastic or thick paper, which is inserted into the V-shaped slot of the guide tube and squeezes the needle handle between its end and the inner wall of the tube opposite to the V-shaped slot.

U.S. Pat. No. 4,518,384 issued to Tarello et al. on May 21, 1985, outlines the use of a medicament discharging device and an expandable clip thereon containing a plurality of medicament cartridges. Each of the cartridges have a container, a dosage of medicament in the container, a hypodermic needle sealingly contained in a sterile condition in cooperating relation with the container and a movable wall at one end of the container operable when moved through a discharging stroke.

U.S. Pat. No. 4,531,938 issued to Kaye et al. on Jul. 30, 1985, outlines the use of an implanter device adapted for insertion of a solid or semi-solid pellet form medicament into a domestic animal and to an encasement containing a multiplicity of dosage unit pellets of the medicament. The encasement is specifically adapted for use in the implanter device.

U.S. Pat. No. 4,946,035 issued to Grimm et al. on Aug. 7, 1990, outlines the use of a medicament implanter system with a single use needle pre-charged with medicament, a cartridge wherein a multiplicity of pre-charged needles may be packaged and an implanter applicator instrument adapted to remove a pre-charged needle into the cartridge. The applicator instrument is constructed so that a needle positioned therein is locked in a properly oriented position for expulsion of the medicament upon operation of an impeller, which forms part of the applicator instrument.

U.S. Pat. No. 5,129,914 issued to Choi on Jul. 14, 1992, outlines the use of a combination container and dispenser and insertion tube for acupuncture needles that provides for the sterile storage, containment, dispensing and insertion of acupuncture needles. A storage portion of the container/dispenser is formed with an insertion tube along one edge and an internal passage between the two components.

Although each of these patents and publications outline the use of novel and useful devices, what is really needed is a container and dispenser for acupuncture needles that is both easy to use and provides for sterile acupuncture needles. Such a device would have a great demand and be well-received in the marketplace.

None of the above inventions and patents, taken either singly or in combination, is seen to describe the instant invention as claimed. Thus a acupuncture needle container and inserter solving the aforementioned problems is desired.

SUMMARY OF THE INVENTION

The invention is an acupuncture needle container and dispenser to store and dispense a plurality of sterile acupuncture needles having a transparent top cover piece and an opaque colored bottom piece with a distal end, a proximal end and a middle portion. The transparent top cover piece fits over the opaque colored bottom piece and forms a semi-oval needle reservoir at the distal end, a cylindrical inserter at the proximal end and a channel formed between the semi-oval needle reservoir and the cylindrical inserter to allow for an individual channeled movement of the plurality of acupuncture needles from the semi-oval needle reservoir through the formed channel and into the cylindrical inserter. In an alternate embodiment of the present invention, the cylindrical inserter includes an insertion tube, a portion of which is magnetized to facilitate receiving and holding a single acupuncture needle in place until it is removed from the dispenser.

Accordingly, it is a principal object of the invention to provide an acupuncture needle container and dispenser that is easy to use and can dispense sterile acupuncture needles.

It is another object of the invention to provide an acupuncture needle container and dispenser that is more economical to use than acupuncture needles contained and dispensed in expensive blister packages.

It is a further object of the invention to provide an acupuncture needle container and dispenser that does not require a user to aim acupuncture needles through a guide tube.

Still another object of the invention is to provide an acupuncture needle container and dispenser that can hold and dispense a large number of sterile acupuncture needles.

It is an object of the invention to provide improved elements and arrangements thereof for the purposes described which are inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
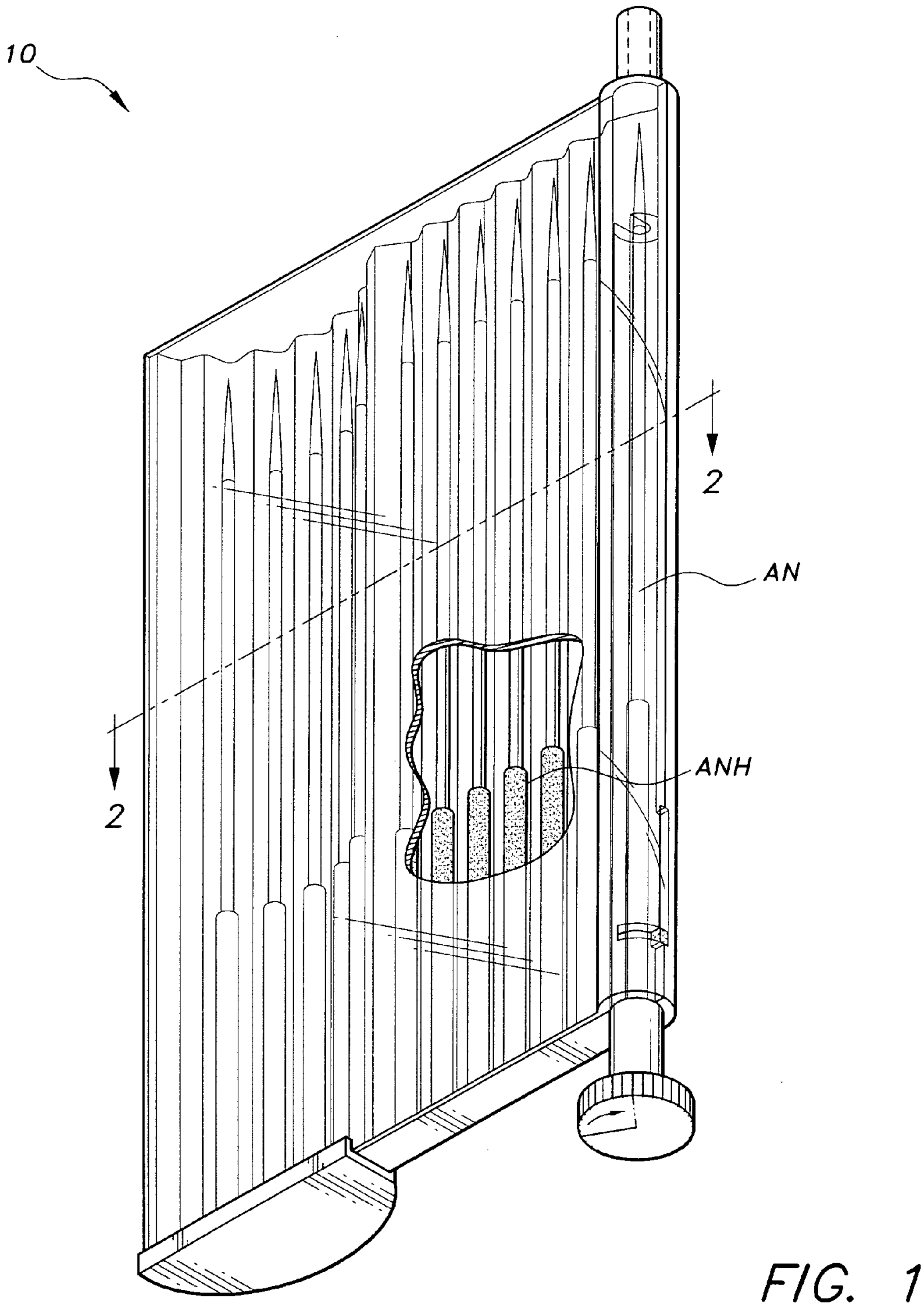
FIG. 1 is an environmental, perspective view of an acupuncture needle container and inserter according to the present invention.

The present invention is an acupuncture needle container and dispenser 10 to store and dispense a plurality of acupuncture needles AN, as is depicted in FIG. 1.

Figure 2:
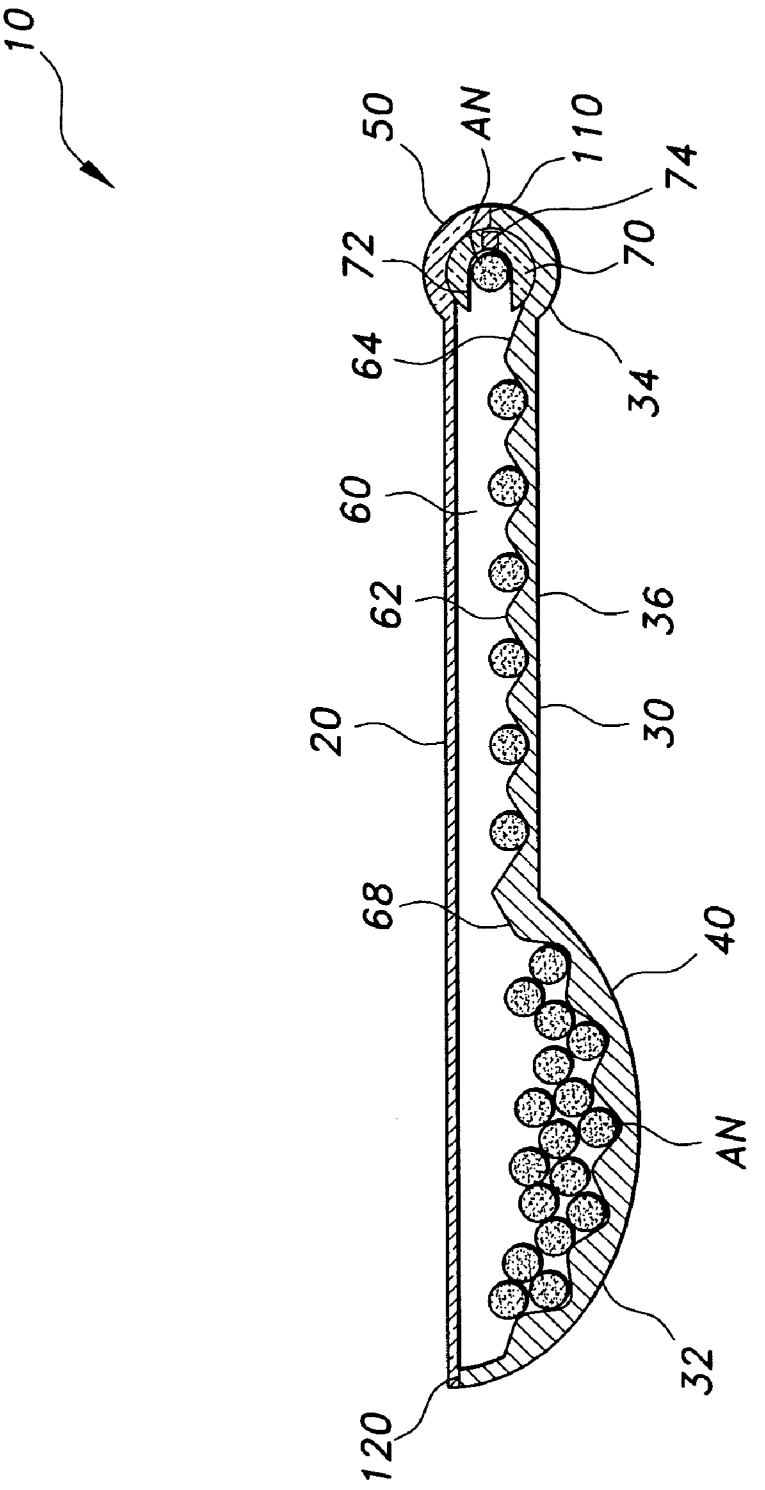
FIG. 2 is a cross-sectional perspective view taken along line 2-2 of FIG. 1 showing the acupuncture needle container and dispenser in a position to receive an acupuncture needle.
Figure 3:
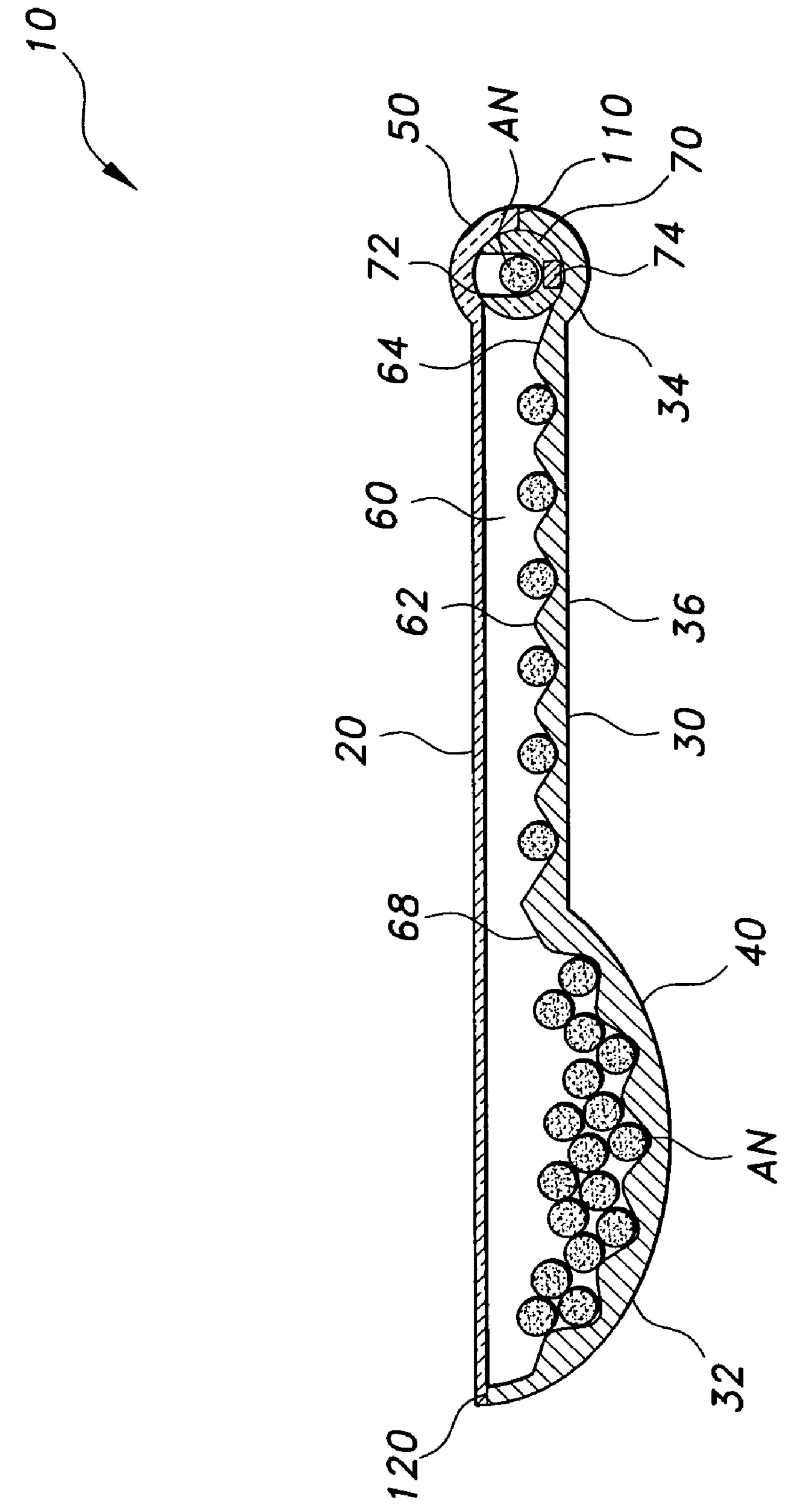
FIG. 3 is a cross-sectional perspective view taken along line 2-2 of FIG. 1 showing the acupuncture needle container and dispenser in a position to dispense an acupuncture needle.

As is depicted in FIG. 2 and FIG. 3, the acupuncture needle container and dispenser 10 comprises a transparent top cover piece 20, an opaque colored bottom piece 30 with a distal end 32, a proximal end 34 and a middle portion 36. The transparent top cover piece 20 fits over the opaque colored bottom piece 30 and forms a semi-oval needle reservoir 40 at the distal end 32, a cylindrical inserter 50 at the proximal end 34 and a channel 60 formed in the middle portion 36 between the semi-oval needle reservoir 40 and the cylindrical inserter 50 to allow for an individual channeled movement of the plurality of acupuncture needles AN from the semi-oval needle reservoir 40 through the formed channel 60 and into the cylindrical inserter 50.

The acupuncture needle container and dispenser 10 further comprises the cylindrical inserter 50 having an insertion tube 70 with a longitudinal slit 72 to receive an individual acupuncture needle AN from the plurality of acupuncture needles AN moving through the formed channel 60. Preferably, a magnet 74 is embedded in the insertion tube 70 opposite the longitudinal slit 72 and is positioned such it magnetically attracts the acupuncture needle handle ANH. Since the acupuncture needle handle ANH is made of stainless steel and has a length of approximately 20 mm, the magnet 74 should be placed at the proximal section of insertion tube 70 opposite the acupuncture needle handle ANH to facilitate pulling a single acupuncture needle AN within the insertion tube 70. The magnet 74 can be of a relatively weak strength and may have dimensions of approximately 4 mm×6 mm to achieve this purpose.

A plunger 80 fits into the insertion tube 70 and pushes the magnetically attracted individual acupuncture needle AN through the cylindrical inserter 50. The plunger 80 has a protruding twisting handle 90 that has indicia (not shown) coinciding with the position of the longitudinal slit 72 on the insertion tube 70. The plunger 80 pushes the acquired individual acupuncture needle AN from the cylindrical inserter 50 into an extrusion guide tube 100 at the distal end of insertion tube 70 for use by a user. The magnet 74 also serves to hold the acupuncture needle AN in place within the insertion tube 70 without being dislodged until it is pushed out of the magnetic field by the plunger 80. Once inserted into the skin of a patient, the acupuncture needle is not likely to be pulled back by the relatively weak magnet 74.

The formed channel 60 of the acupuncture needle container and dispenser 10 is provided with individual grooves 62 that can hold a sequential series of individual acupuncture needles within the formed channel 60. There is an oversized first groove 68 between the semi-oval reservoir 40 and the formed channel 60, which is designed to provide some separation between the semi-oval reservoir 40 and the formed channel 60. Each groove is designed to loosely hold a single acupuncture needle AN. An individual channeled movement of the plurality of the acupuncture needles AN is produced by tilting and shaking the acupuncture needle container and dispenser 10. The acupuncture needle container and dispenser 10 has an overall catamaran shape that is about the size of a user's palm and can be easily grasped for holding or shaking. The last groove 64 of the plurality of grooves 62 has a 30 degree downward slope to facilitate an acupuncture needle AN to drop into the insertion tube 70 under the magnetic attraction of magnet 74.

Once inside the insertion tube 70, the acupuncture needle AN is prevented from being dislodged by magnet 74 until plunger 80 pushes it forward to the extrusion guide tube 100 for eventual use by a user. The insertion tube 70 has a longitudinal slit 72 that is juxtaposed to an individual acupuncture needle AN moving through the formed channel 60 and into the insertion tube 70. This positioning of the longitudinal slit 72 is depicted in FIG. 2. The positioning of the longitudinal slit 72 is controlled by the protruding twisting handle 90, which is described in more detail in the FIG. 4 discussion of this application. Due to the transparency of the transparent top cover piece 20 and the transparency of the insertion tube 70, the entire process of moving, loading and dispensing the acupuncture needle AN is visible from the outside of the acupuncture needle container and dispenser 10. There are two seams 110, 120 that indicate where the transparent top cover piece 20 and the opaque colored bottom piece 30 come together to form a sterile seam, which is very important since the acupuncture needles AN are designed to stay sterile while being stored or dispensed by the acupuncture needle container and dispenser 10.

Figure 4:
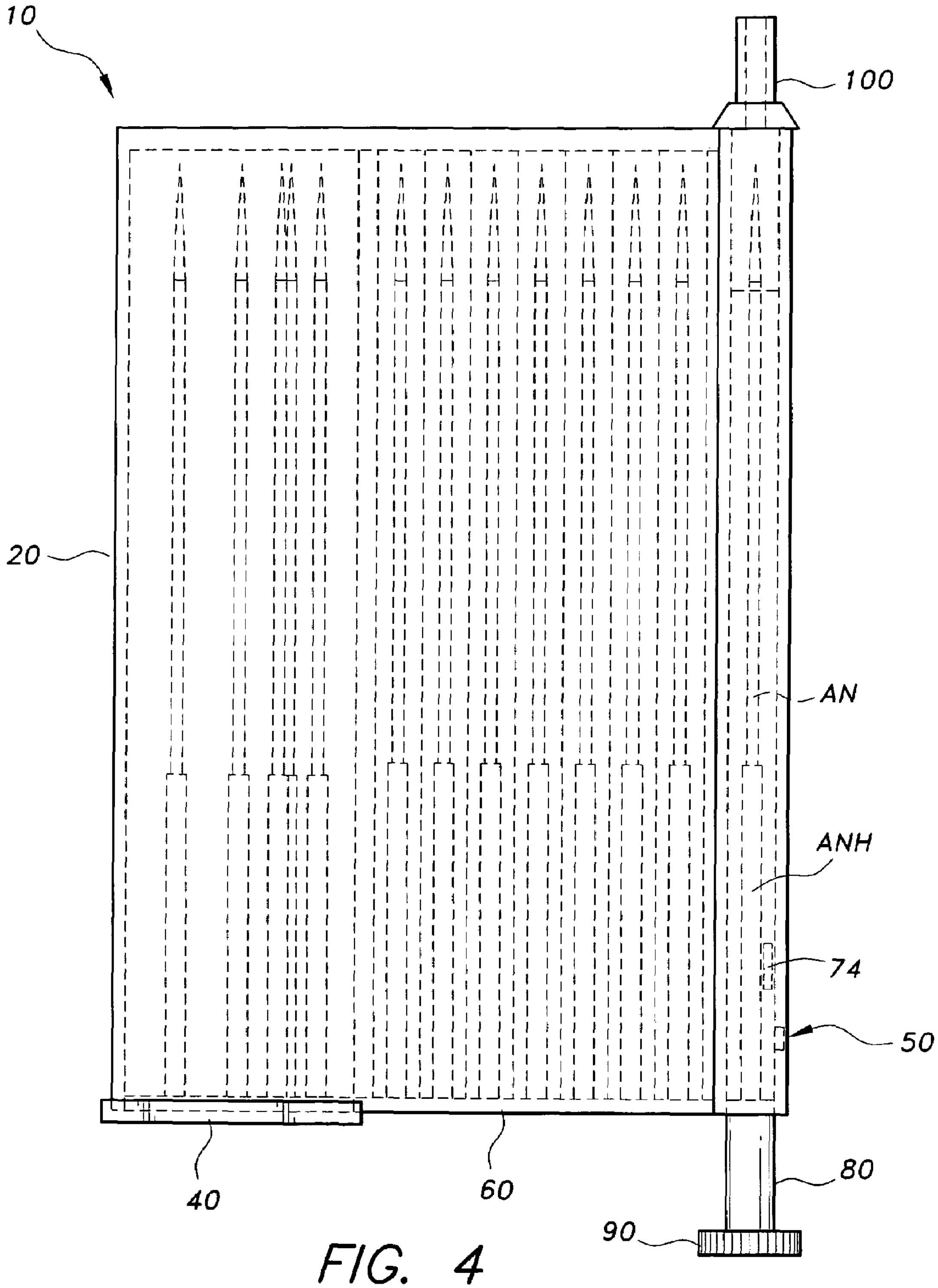
FIG. 4 is an overhead perspective view of the acupuncture needle container and dispenser.

As depicted in FIG. 3 and FIG. 4, the acupuncture needle container and dispenser 10 and the longitudinal slit 72 are not juxtaposed to the individual acupuncture needles AN moving through the formed channel 60 and cannot enter the insertion tube 70. Once in this position, no more individual acupuncture needles AN can enter into the longitudinal slit 72 and the plunger 80 can be pushed in towards the cylindrical inserter 50 to push the captured acupuncture needle AN out of the cylindrical inserter 50 and into the extrusion guide tube 100. The plunger 80 must be fully pushed in to dispense any acupuncture needle AN. There is a click and hold mechanism (not shown) built in when the insertion tube 70 and longitudinal slit 72 are in an open position, such as depicted in FIG. 2 and a closed dispensing position, such as depicted in FIG. 3. When the plunger 80 is pushed in and the insertion tube 70 and longitudinal slit 72 are in the closed position, the plurality of acupuncture needles AN will remain locked in the semi-oval reservoir 40. The extrusion guide tube 100 can also be changed as needed to ensure sterility of any dispensed acupuncture needles AN.

Use of the acupuncture needle container and dispenser 10 is straightforward. The color of the opaque colored bottom piece 30 is turquoise to provide a proper background to make the acupuncture needles AN readily visible. The distal end 32 of the acupuncture needle container and dispenser 10 is scalloped for an easier grip to shake or tilt the acupuncture needle container and dispenser 10 as desired. The plunger 80 is easily pushed in and can be easily pulled back for reuse. The protruding twisting handle 90 at the proximal section of the insertion tube 70 can be easily turned and locks into the open and dispensing positions discussed previously. The extrusion guide tube 100 at the distal end of the insertion tube 70 can also be easily replaced by hand as needed.

It is to be understood that the present invention is not limited to the embodiment described above, but encompasses any and all embodiments within the scope of the following claims.

I claim:

1. An acupuncture needle container and dispenser to store and dispense a plurality of acupuncture needles, comprising:

a transparent top cover piece, an opaque colored bottom piece with a distal end, a proximal end and a middle portion, said transparent top cover piece fits over the opaque colored bottom piece to form a semi-oval needle reservoir at the distal end, a cylindrical inserter at the proximal end and a channel between the semi-oval needle reservoir and the cylindrical inserter to allow for individual channeled movement of the plurality of acupuncture needles from the semi-oval needle reservoir through the channel and into the cylindrical inserter;

an insertion tube within said cylindrical inserter with a longitudinal slit to receive an individual acupuncture needle from the plurality of needles moving through the channel, wherein said insertion tube includes a magnet embedded therein;

a plunger that fits into the insertion tube and pushes the individual acupuncture needle through the cylindrical inserter, said plunger having a protruding twisting handle that extends from a proximal section of said insertion tube for moving the longitudinal slit between an open position and a dispensing position; and an extrusion guide tube extending from a distal end of said insertion tube.

2. The acupuncture needle container and dispenser according to claim 1, wherein said magnet is embedded within the proximal section of said insertion tube opposite longitudinal slit.

3. The acupuncture needle container and dispenser according to claim 1, wherein the channel is provided with individual grooves for holding sequential series of individual acupuncture needles.

4. The acupuncture needle container and dispenser according to claim 1, wherein the individual channeled movement of the plurality of acupuncture needles is produced by tilting and shaking the acupuncture needle container and dispenser.

5. The acupuncture needle container and dispenser according to claim 1, wherein the protruding twisting handle is moved to an open position such that the longitudinal slit is juxtaposed to an individual acupuncture needle moving through the channel.

6. The acupuncture needle container and dispenser according to claim 1, wherein the protruding twisting handle is moved to a closed dispensing position when one of the individual acupuncture needles enters the insertion tube such that the longitudinal slit is not juxtaposed to the individual acupuncture needles moving through the channel and another one of the individual acupuncture needles cannot enter the insertion tube.

7. An acupuncture needle container and dispenser, comprising:

a transparent top cover piece;

an opaque colored bottom piece having a distal end, a proximal end and a middle portion, said transparent top cover piece fitting over the opaque colored bottom piece to form a semi-oval needle reservoir at the distal end, a cylindrical inserter at the proximal end and a channel between the semi-oval needle reservoir and the cylindrical inserter to provide for individual channeled movement of a plurality of acupuncture needles from the semi-oval needle reservoir through the channel and into the cylindrical inserter;

an insertion tube disposed within said cylindrical inserter and having a proximal section and a distal end, said insertion tube including a longitudinal slit extending from the proximal section to the distal end, the proximal section containing a magnet to facilitate attracting a selected acupuncture needle into the longitudinal slit from the plurality of needles moving through the channel;

a plunger extendable within said insertion tube for pushing the selected acupuncture needle through the cylindrical inserter, said plunger having a protruding twisting handle adjacent the proximal section of the insertion tube for positioning the longitudinal slit within said cylindrical inserter relative to the channel; and an extrusion guide tube extending from the distal end of said insertion tube.

8. The acupuncture needle container and dispenser according to claim 7, wherein said magnet is embedded in said insertion tube opposite the longitudinal slit.

9. The acupuncture needle container and dispenser according to claim 7, wherein said magnet is of a relatively weak strength and has dimensions of approximately 4 mm×6 mm.

* * * * *